United States Patent [19]

Simon et al.

[11] Patent Number: 5,111,656
[45] Date of Patent: May 12, 1992

[54] ARCJET NOZZLE HAVING IMPROVED ELECTRICAL-TO-THRUST CONVERSION EFFICIENCY AND HIGH VOLTAGE OPERATION

[75] Inventors: Mark A. Simon, Redmond; George W. Butler, Seattle, both of Wash.

[73] Assignee: Olin Corporation, Cheshire, Conn.

[21] Appl. No.: 552,711

[22] Filed: Jul. 12, 1990

[51] Int. Cl.⁵ .............................................. F02K 11/00
[52] U.S. Cl. .............................................. 60/203.1
[58] Field of Search ........................ 60/200.1, 203.1; 219/121.11, 121.48, 121.5

[56] References Cited

U.S. PATENT DOCUMENTS

| | | |
|---|---|---|
| 3,425,223 | 2/1969 | Browning . |
| 3,603,089 | 9/1971 | Esker et al. . |
| 4,800,716 | 1/1989 | Smith et al. . |
| 4,805,400 | 2/1989 | Knowles ............................. 60/203.1 |
| 4,882,465 | 11/1989 | Smith et al. . |
| 4,907,407 | 3/1990 | Simon et al. ....................... 60/203.1 |
| 4,926,632 | 5/1990 | Smith et al. . |
| 4,995,231 | 2/1991 | Smith et al. ....................... 60/203.1 |

OTHER PUBLICATIONS

ARC-Jet Thrustor for Space Propulsion, Lewis E. Wallner and Joseph Czika, Jr. 1965.
Physics of Electric Propulsion, Robert G. Jahn, McGraw-Hill Book Co., 1968 pp. 90-130.

Primary Examiner—Louis J. Casaregola
Attorney, Agent, or Firm—John R. Wahl

[57] ABSTRACT

An arcjet thruster is disclosed which has an electrically conductive anode body having an anode cavity therein which defines a nozzle symmetrical about a central axis. The anode cavity has a tandemly arranged divergent recombination portion and a divergent expansion portion. The expansion portion has a greater rate of divergence than the recombination portion. The anode body further preferably comprises a cylindrical constrictor portion upstream and in tandem with the recombination portion. An electrically conductive cylindrical cathode body is coaxially arranged and spaced from the anode body by a gap. An electrical current source connected to the cathode and the anode produces an electrical arc across the gap. A vortex flow of propellant gas is fed through the gap and through the nozzle to produce thrust. The vortex flow of propellant gas pushes the arc through the constrictor into one of the divergent portions of the nozzle. The recombination and expansion portions merge at a transition being between a divergence of 5 and 15 degrees and within a diameter ratio range of the transition to the constrictor of about 1.5 to 4.0. The divergent recombination portion causes a portion of the ionized and disassociated propellant gas passing therethrough to recombine, recovering frozen flow losses prior to entering the expansion portion and increasing the overall energy conversion efficiency of the thruster.

28 Claims, 3 Drawing Sheets

ARCJET NOZZLE HAVING IMPROVED ELECTRICAL-TO-THRUST CONVERSION EFFICIENCY AND HIGH VOLTAGE OPERATION

The present invention generally relates to electrothermal propulsion devices and more specifically to an improved arcjet thruster.

Typical arcjet thrusters utilize an electrical arc to heat a flowing propellant as it passes through an arc chamber shaped generally as a convergent/divergent nozzle. The conventional thruster typically has a hollow anode body having a cavity therethrough which defines the nozzle. Coaxially aligned with and spaced from the nozzle is a cylindrical cathode. The anode and cathode are usually made of tungsten or other high temperature metal alloy.

Typical arcjet thrusters are disclosed in U.S. Pat. Nos. 3,603,089 and 3,425,223 and are also described in "Physics of Electric Propulsion", by Robert G. Jahn, McGraw Hill, pages 90 to 130. Improved efficiency arcjet thrusters are disclosed in U.S. Pat. Nos. 4,800,716 and 4,882,465, and 4,926,632 assigned to the assignee of the present invention.

A simplified example of a conventional arcjet thruster is schematically illustrated in cross-section in FIG. 1. This arcjet thruster 10 has a generally hollow anode body 12 which defines therein a divergent nozzle 14. Nozzle 14 is symmetrical about a central axis 16. Coaxially aligned and spaced upstream of the anode body 12 is a cylindrical cathode 18 which has a generally conical cathode tip 20. This tip is spaced from the anode body 12 by a gap 22.

A propellant gas 24 is fed in a vortex flow into nozzle 14 through gap 22, past a nozzle throat 26 and a constrictor portion 28, and then expanded through a divergent portion 30 of the nozzle 14 to produce thrust.

Simultaneously, an electrical potential is applied between the cathode 18 and the anode body 12 to produce an arc 32 across the gap 22. The arc 32, emanating from the cathode, is pushed through the throat 26 and through the cylindrical constrictor 28 by the flowing propellant so that the downstream end of the arc 32 attaches to the anode body 12 in the divergent portion 30 of nozzle 14. Thus the constrictor 28 serves to elongate the arc, prolonging the arc contact time with the propellant. This increases the heat transfer between the arc 32 and the propellant 24 passing through the constrictor 28.

The constrictor length is chosen based on the particular arcjet application. In some applications, the constrictor may not be desired. In this case the constrictor would effectively have a zero length.

The vortex flow of the propellant through the constrictor 28 into the divergent portion 20 of the nozzle produces a central low density region along the axis 16 through the constrictor 28 which tends to stabilize the arc 32. In addition, the vortex flow of the propellant 24 through the constrictor 28 is preferably laminar adjacent the surface of the constrictor 28. This laminar flow of propellant effectively insulates the portion of the anode body 12 adjacent the constrictor 28. This minimizes the heat transfer to the anode body 12 by the arc in the region of the constrictor.

Basically, the high temperature and the electromagnetic fields of the electrical arc 32 cause thermal excitation, ionization and partial disassociation of the propellant 24 as it flows through the throat, the constrictor, and into the divergent portion of the nozzle 14. The ionized and disassociated propellant 24 is then expanded in the divergent portion 30 to produce thrust. The efficiency with which the electrical energy of the arc 32 is converted to kinetic energy in the arcjet thruster 10 is partially limited by the energy which is transferred from the arc to the molecules of the gas in disassociation and ionization of the propellant gas as it passes through the arc in the throat and through the constrictor 28.

A portion of this energy may be regained by recombination and reassociation of the ions and neutral species. However, recombination and deionization occurs slowly in comparison to the propellant transit time through the nozzle and therefore occurs downstream of the nozzle. Accordingly, the energy utilized in disassociation and ionization of the propellant gas is effectively lost. This loss is generally termed a frozen flow loss. The frozen flow losses limit the obtainable efficiency in conventional arcjet thruster designs to about 30 percent efficiency.

Various attempts have been considered and tried to regain frozen flow losses and thus improve the efficiency of arcjet thrusters. One attempt is illustrated in FIG. 2. In this simplified sectional view of an arcjet thruster 40 designed by Gianninni Corporation, it was thought that if the entire arc 32 could be constrained within the constrictor 42, and a mixing chamber effectively produced therein, the frozen flow losses could be recovered. In this prior art design, constrictor 42 included an enlarged mixing chamber section 44 terminating in a throat 46. The arc 32 attached to the anode body 12 inside the enlarged portion 44. The mixing chamber 44 provided an increased residence time for the gas as it passed through the constrictor 42 which allowed partial recombination and hence recovery of some of the frozen flow losses.

However, as arc attachment resided in the mixing chamber 44, substantial heat was transferred to the anode wall, netting very little or no improvement in the overall efficiency.

Thus there is still a continued need for an improved efficiency arcjet thruster which minimizes the inherent losses, recovers frozen flow losses, and maximizes the effective electrical to thrust energy conversion efficiency.

Accordingly, it is an object of the present invention to provide an improved efficiency arcjet thruster having reduced frozen flow losses.

It is another object of the present invention to provide an arcjet thruster having an increased lifetime.

It is a still further object of the present invention to provide an improved performance arcjet thruster operating with a high voltage for a given power level.

The arcjet thruster in accordance with the present invention is a thruster having a convergent/divergent nozzle. The divergent part of the nozzle has a divergent recombination portion in tandem with a divergent expansion portion to permit recovery of frozen flow losses and conversion thereof to useful thrust. The expansion portion has a greater rate of divergence than the recombination portion. The transit of the vortex flow of ionized propellant gas passing through the throat and/or constrictor is delayed in the recombination portion of the divergent nozzle to allow for recombination to take place and heat to be released to the gas in the form of kinetic energy. In other words, the recombination portion allows ionic, dissociative, and rotational energy modes to relax into translational modes which can then be converted to thrust in the nozzle. Thus some of the frozen flow losses are recovered prior to the gas entering the divergent expansion portion of the nozzle.

It has been found that the transition between the recombination portion and the expansion portion must occur in a specific region downstream of the constrictor.

This transition region of the nozzle is bounded axially by a nozzle diameter equal to about 1.5 times the constrictor diameter and a nozzle diameter equal to about 4.0 times the constrictor diameter, and by a divergence angle from the constrictor of between about 5 degrees and about 15 degrees.

The shape of the transition may be gradual or sharp. For example, a smooth shape may be used so long as the transition occurs within the region defined above, substantial recombination will occur resulting in a substantial increase in efficiency.

One preferred arrangement having conical recombination and expansion portions is basically a bi-angle divergent nozzle. It creates a high pressure region in the recombination portion which enhances ion recombination and hence recovery of frozen flow losses. An increase in overall efficiency of about 7 percent has been achieved.

The expansion portion has a cone half angle of between 20 and 40 degrees. The recombination portion has a cone half angle of between 5 and 15 degrees. In addition, the ratio of diameters between the transition of the recombination and expansion portion and the constrictor or throat is preferably between about 1.5 and 4.0. In one optimized preferred embodiment the cone angles are seven degrees for the recombination portion and 20 degrees for the expansion portion.

The arcjet thruster in accordance with the present invention also results in an arc voltage which is substantially higher than that of comparable conventional arcjet nozzle designs operating with the same power and flow inputs. This permits arcjet operation at a substantially lower current level for the same applied voltage which in turn implies increased arcjet lifetime, smaller overall system size, and better reliability.

Other objects, features, and advantages of the present invention will become more apparent from a reading of the following detailed description when taken in conjunction with the accompanying drawing and appended claims.

Figure 3:
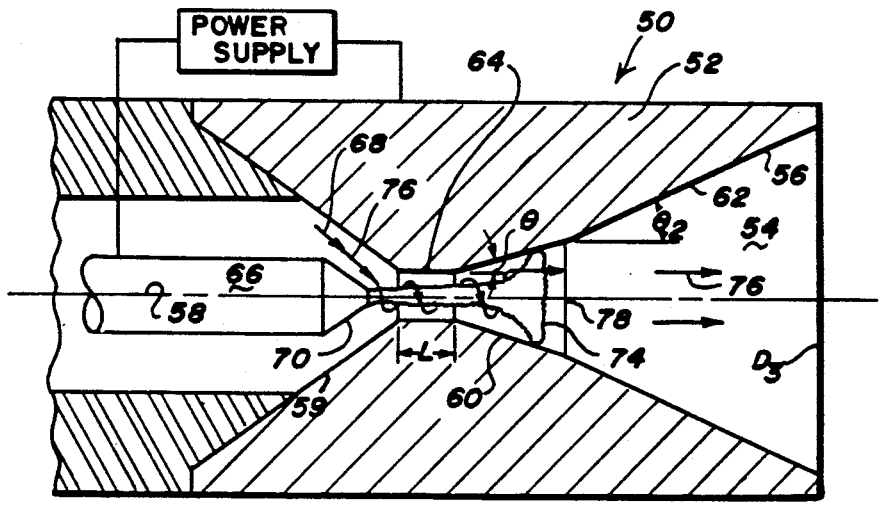
FIG. 3 is a partial sectional view of an arcjet thruster having a bi-angle nozzle in accordance with the present invention.

One preferred embodiment of the arcjet thruster in accordance with the present invention is schematically illustrated in FIG. 3. The arcjet thruster 50 includes an electrically conductive anode body 52 having an anode cavity 54 therein which defines a convergent/divergent nozzle 56 symmetrical about a central axis 58. In this embodiments, the anode cavity 54 has a convergent portion 59 and a tandemly arranged conical divergent recombination portion 60 and a divergent conical expansion portion 62.

Optionally, and as illustrated in FIG. 3, the anode cavity 54 may further include a cylindrical constrictor portion 64 upstream of and merging with recombination portion 60 coaxially with axis 58. The constrictor portion 64 effectively constitutes a nozzle throat having a length "L". The length "L" is preferably about equal to the constrictor diameter "D".

A cathode body 66, having a generally cylindrical shape, is coaxially positioned along the axis 58 and spaced from the convergent portion 59 of the anode body 52 by a gap 68. Cathode 66 preferably includes a generally conical pointed tip 70. An electrical current supplying means such as a DC power supply 72 is electrically connected to the cathode body 66 and to the anode body 52 to produce an electrical arc 74 across the gap 68. A vortex flow of propellant gas 76 is injected, preferably tangentially, along cathode tip 70 through gap 68 and radially and tangentially into the constrictor 64. The vortex flow of propellant 76 pushes one end of the arc 74 downstream through the constrictor 64 causing the arc to diffusely attach to the anode 52 in either the recombination portion 60 or the divergent expansion portion 62 depending upon the supply pressure of the propellant 76. As previously described, the arc heats, disassociates and at least partially ionizes the propellant gas 76 as the gas passes through the constrictor 64.

The expansion portion 62 has a greater rate of divergence ($\theta_2$) than that of the recombination portion 60 ($\theta_1$). The expansion portion 62 and recombination portion 60 are conically shaped in FIG. 3. It is to be understood that these portions need not be conical so long as the expansion portion has a rate of divergence greater than that of the recombination portion.

Figure 5:
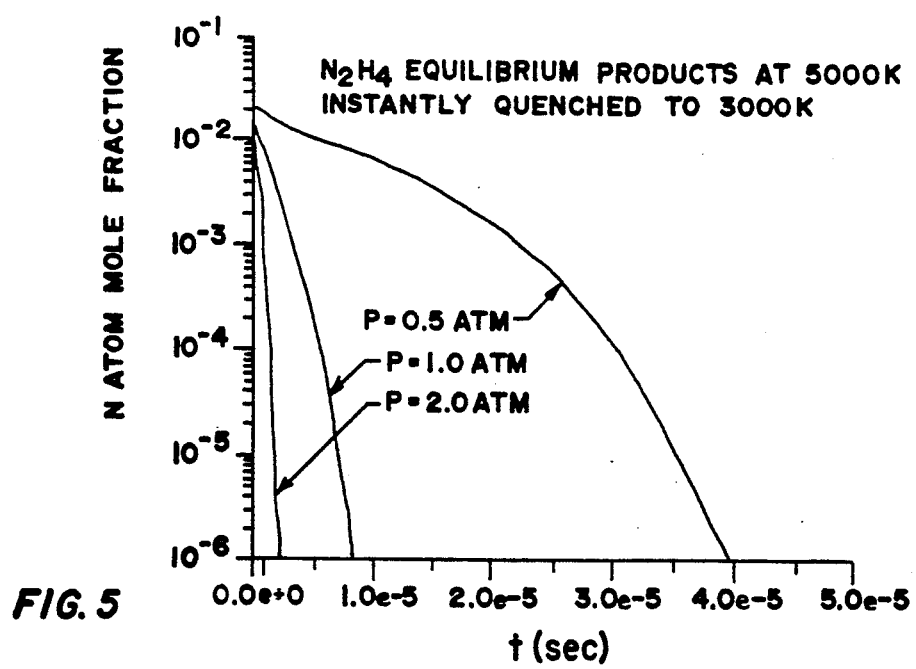
FIG. 5 is a graph of mole fraction versus recombination rate illustrating the pressure affects on recombination rate for hydrazine propellant.

The divergence of the recombination portion 60, being less than that of the divergent expansion portion 56, i.e., $\theta_1 \theta_2$, causes a temporary delay in the pressure reduction and the expansion of the ionized and disassociated propellant 76. This delay creates a relatively high pressure region in the divergent recombination portion 60 of the nozzle which permits a partial recombination of the ionized and neutral species of the propellant gas 76. A comparison of recombination rates at various pressures is shown in FIG. 5. This Figure illustrates that the delay at a relatively high pressure permits at least a partial recovery of frozen flow losses back into the gas.

In other words, as the ions and neutral species recombine in the recombination portion 60, heat is returned to the gas which then is available to be converted to thrust as the gas expands through the divergent expansion portion 62 of the nozzle 56. Thus the portion of the propellant which recombines in the recombination portion 60 increases the overall energy conversion efficiency of the propellant gas 76 flowing through the nozzle 56 of the arcjet thruster 50. The attainable overall efficiency has been demonstrated, with the present invention, to increase from 33 to over 37 percent over the baseline nozzle having simply a straight divergence of 20 degrees.

Figure 1:
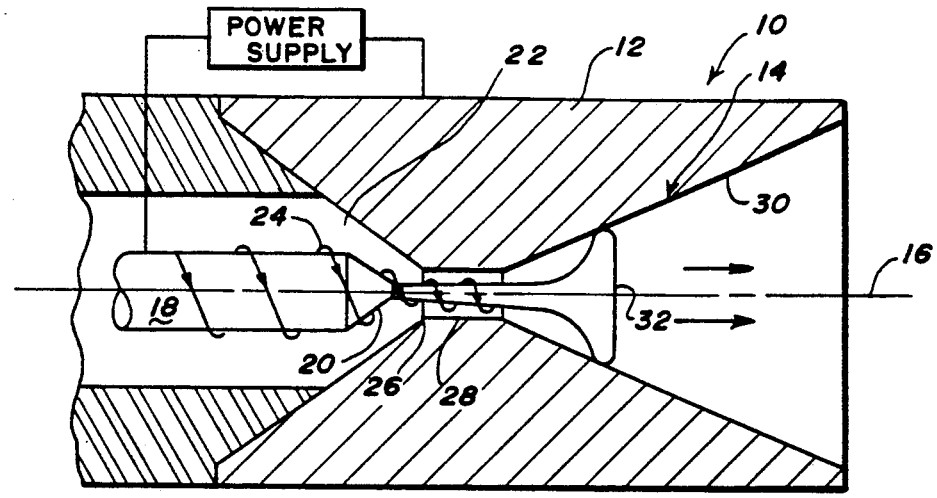
FIG. 1 is a schematic partial longitudinal sectional view of a conventional arcjet thruster known in the prior art.
Figure 2:
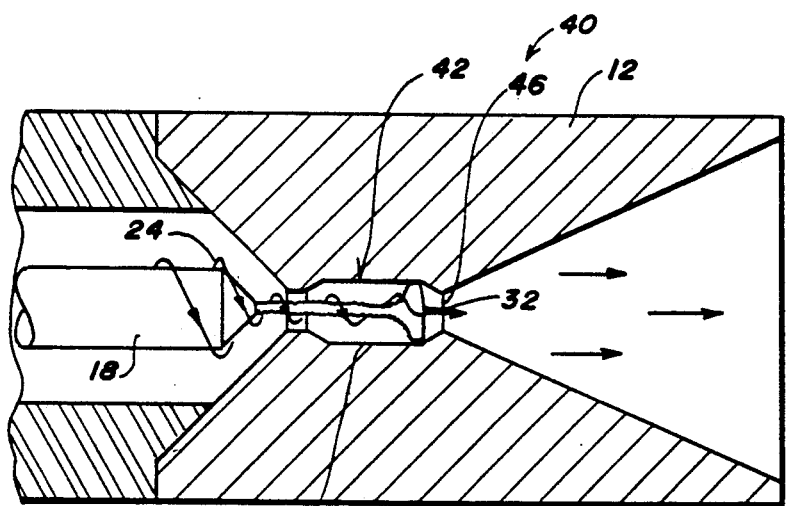
FIG. 2 is a partial sectional view of another conventional arcjet thruster known in the prior art.
Figure 4:
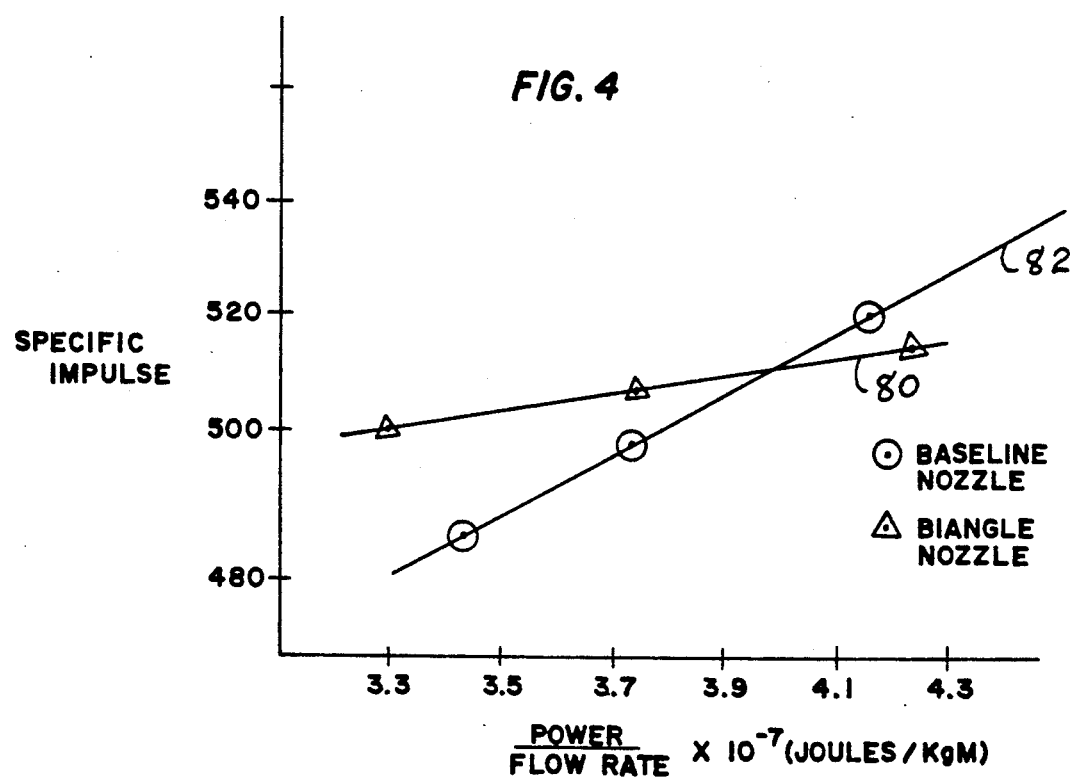
FIG. 4 is a graph of specific impulse versus power to flow rate ratio which compares the specific impulse attainable with one embodiment of the nozzle of the present invention to the prior art nozzle shown in FIG. 1.

The specific impulse of the propellant gas for different power/flow rates, when utilized in the thruster in accordance with the present invention, is illustrated in FIG. 4. The specific impulse attained with hydrazine in the arcjet thruster in accordance with one preferred embodiment of the present invention, is illustrated by biangle nozzle curve 80. The specific impulse attributable to the prior art nozzle having a divergence cone angle of 20 degrees, illustrated in FIG. 1 is shown by the baseline curve in FIG. 4. As can readily been seen, the specific impulse of the thruster in accordance with the present invention is about 10 to 20 seconds greater than that of the prior art nozzle at the power to flow ratios of 3.2 to 3.8, which are of particular interest in thrusters of less than 2.5 Kw.

The phenomenon believed to be responsible for the increase in efficiency observed is illustrated in FIG. 5. The energy normally lost as frozen flow can be recovered if the proper environment is created to accelerate the recombination and relaxation rates or to increase the time available for recovery and minimize the heat losses to the thruster anode walls. Recombination rates increase significantly at higher pressures. For example, at a pressure of one atmosphere, the recombination rate is about four times that of the same gas at half the pressure. In the thruster shown in FIG. 3, the recombination region 60 provides a relatively high pressure divergent region in which recombination and recovery of frozen flow energy can take place.

The dimensional relationships between the divergent expansion portion and the recombination portion are important to an arcjet thruster having this improved efficiency. These relationships are broadly illustrated in the enlarged partial sectional view of FIG. 6.

The transition 78 between the expansion portion 62 and the recombination portion 60 must occur within a transition region 84. The transition may be sharp, as in the biangle design, or may be a smooth curve, so long as the transition is within this transition region. In addition, the recombination and expansion portions may be conical as shown or a curved, trumpet shaped.

The transition region 84 is directly related to the constrictor diameter D. The region 84 is axially bound by an upstream location equal to about 1.5 D and a downstream location equal to about 4.0 D and between divergence angles of about 5 degrees and 15 degrees originating at the constrictor exit 86.

Figure 6:
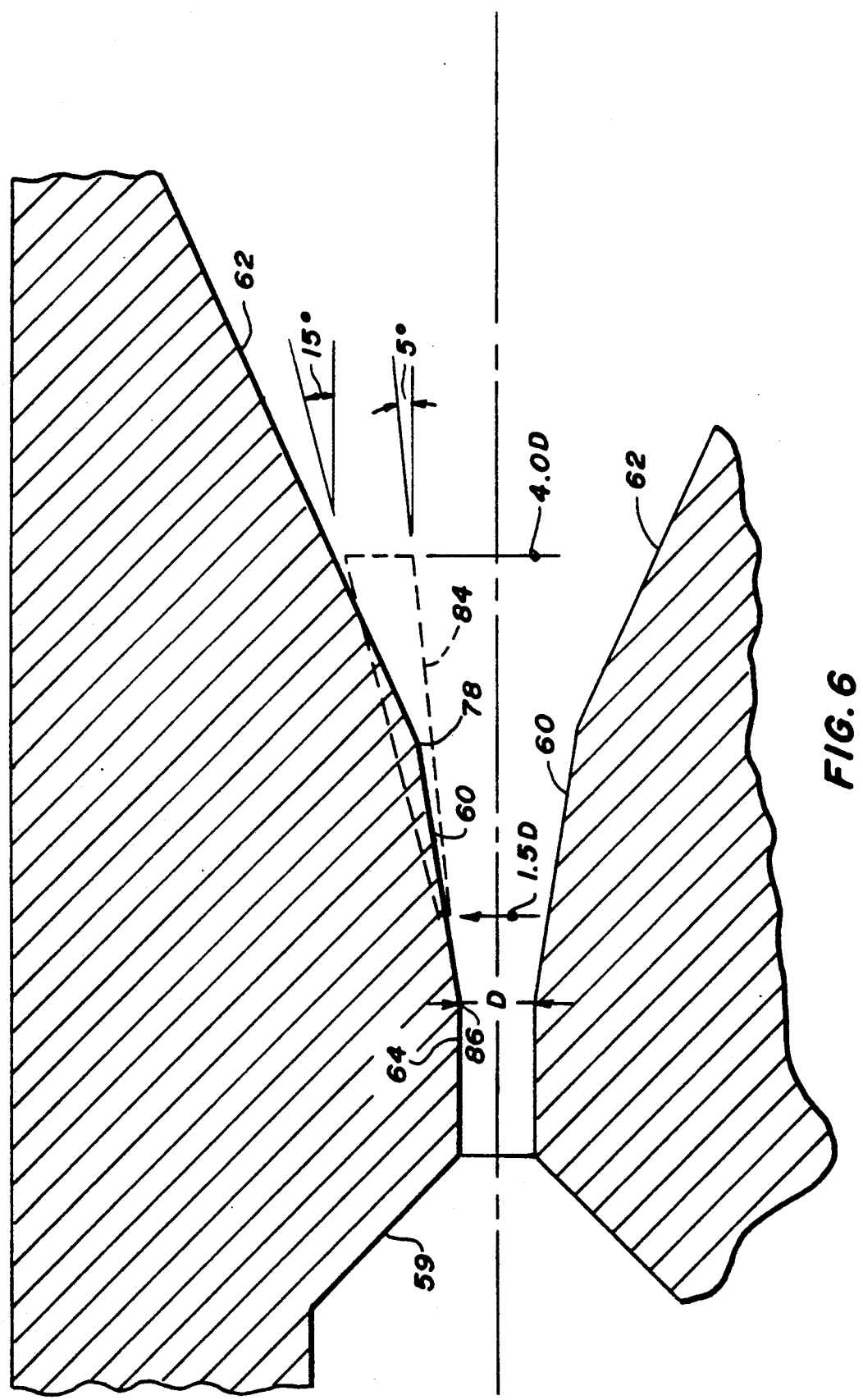
FIG. 6 is an enlarged partial longitudinal sectional view of the thruster of FIG. 3 illustrating the transition region location.

In the conical configurations illustrated in FIGS. 3 and 6 it has been found that the overall efficiency is optimal when the recombination portion 60 has a cone half angle ($\theta_1$) of between about 5 degrees and 15 degrees and the expansion portion has a cone half angle ($\theta_2$) of between 20 degrees and about 40 degrees. The diameter of the circular mouth 80 of the nozzle 56 preferably has a ratio with respect to the constrictor portion within a range of about 30 to 250.

More specifically, the optimum efficiency for $N_2H_4$ propellant maybe obtained with a $\theta_1$ equal to about 7 degrees and $\theta_2$ equal to about 20 degrees. Finally, it has been found that the length L of the constrictor portion 64 is optimum when it is about equal to the diameter of the constrictor portion 64

The design of the nozzle according to the present invention which allows for recovery of frozen flow energy in a divergent recombination region with a relatively slow rate of propellant expansion just downstream of the nozzle throat or constrictor, followed by an expansion region of much higher rate of expansion produces a substantially higher overall electrical to kinetic energy conversion efficiency over previous designs of arcjet nozzles. Furthermore, the nozzle design results in arcjet electrical operation at an arc voltage substantially higher than that of conventional arcjet nozzle designs operating with the same power and flow rate inputs.

For example, referring again to FIG. 4, a 1.7 Kw nozzle according to the present invention utilized an applied voltage of 176 volts and a current of 9.7 amps. In contrast, the conventional 1.7 Kw nozzle as shown in FIG. 1 utilized a voltage of 126 volts with a current of 13.5 amps. Accordingly, in the case of the arcjet thruster of the present invention the current level is reduced by over 25 percent with the same power and flow rate inputs. This illustrates the potential for reduction of the cathode and anode erosion rates commonly present in conventional constricted arcjet thrusters. This has important arcjet life and also arcjet system level benefits. For example, the power supply may be smaller, the size and mass of electrical cabling may be reduced, and so forth.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. An arcjet thruster comprising:

an electrically conductive anode body having an anode cavity therein defining a divergent nozzle symmetrical about a central axis therethrough, said nozzle having a tandemly arranged cylindrical constrictor, a divergent recombination portion and a divergent expansion portion, said divergent expansion portion having a greater rate of divergence than said recombination portion;

a cathode body coaxial with and spaced from said anode body by a gap;

an electrical current supplying means connected to said cathode body and said anode body for producing an electrical arc across said gap between said bodies; and means for injecting a vortex flow of propellant gas through said gap into said nozzle, said arc at least partially ionizing and disassociating said propellant gas;

said propellant flow pushing one end of said arc into said recombination portion, a portion of said ionized and disassociated propellant recombining in said recombination portion so as to increase the energy conversion efficiency of said propellant gas flowing through said nozzle.

2. The thruster according to claim 1 wherein each of said divergent portions has a generally conical shape.

3. The thruster according to claim 2 wherein said recombination portion has a cone half angle of between about 5 degrees and 15 degrees.

4. The thruster according to claim 2 wherein said expansion portion has a cone half angle of between about 20 degrees and about 40 degrees.

5. The thruster according to claim 3 wherein said expansion portion has a cone half angle equal to or less than about 40 degrees.

6. The thruster according to claim 2 wherein said recombination portion and said expansion portion merge at a circular transition, said transition and said constrictor having a diameter ratio of said transition to said constrictor within a range from about 1.5 to about 4.0.

7. The thruster according to claim 6 wherein said expansion portion terminates in a circular mouth, said mouth and said constrictor portion having a diameter ratio of said mouth to said constrictor portion within a range from about 30 to about 250.

8. The thruster according to claim 6 wherein the length of said cylindrical constrictor portion is about equal to its diameter.

9. The thruster according to claim 5 wherein said recombination portion and said expansion portion merging at a circular transition, said transition and said constrictor portion having a diameter ratio of said transition to said constrictor within a range from about 1.5 to about 4.0.

10. The thruster according to claim 9 wherein said expansion portion terminates in a circular mouth, said mouth and said constrictor portion having a diameter ratio of said mouth to said constrictor portion within a range from about 30 to about 250.

11. An arcjet thruster comprising:
an electrically conductive anode body having a central cavity therethrough defining a nozzle symmetrical about a central axis;
an electrically conductive cathode body symmetrical about said axis and spaced from said anode body by a gap;
means for injecting a vortex flow of propellant gas into said gap and through said nozzle; and
an electrical current supplying means connected to said cathode and said anode for producing an electrical arc across said gap;
said nozzle having in tandem a cylindrical constrictor portion, a divergent conical recombination portion having a first cone half angle, and a divergent conical expansion portion having a second cone half angle greater than said first cone angle, said first cone half angle being within a range from about 5 degrees to about 15 degrees.

12. The thruster according to claim 11 wherein said second cone half angle is within a range from about 20 degrees to about 40 degrees.

13. The thruster according to claim 12 wherein said first angle is about 7 degrees.

14. The thruster according to claim 13 wherein said second angle is about 20 degrees.

15. The thruster according to claim 12 wherein said divergent portions merge at a circular transition, said transition and said constrictor having a diameter ratio of said transition to said constrictor within a range from about 1.5 to about 4.0.

16. The thruster according to claim 15 wherein said divergent expansion portion terminates at an open circular nozzle mouth, said mouth and said constrictor having a diameter ratio if said mouth to said constrictor within a range from about 30 to about 250.

17. The thruster according to claim 12 wherein said divergent expansion portion terminates at an open circular nozzle mouth, said mouth and said constrictor having a diameter ratio of said mouth to said constrictor within a range from about 30 to about 250.

18. The thruster according to claim 16 wherein said propellant gas is injected radially and tangentially into said constrictor portion of said anode cavity.

19. In an arcjet thruster comprising an electrically conductive anode body defining a nozzle symmetrical about a central axis therethrough, a cathode body on said central axis and spaced from said anode body by a gap, an electrical current supplying means connected to said cathode and anode bodies for producing an electrical arc across said gap, and a means for injecting a vortex flow of propellant gas, the improvement comprising said nozzle having a tandemly arranged divergent combination portion and a divergent expansion portion, each of said divergent portions having a generally conically shape, said divergent expansion portion having a greater angle of divergence than said recombination portion, wherein said anode nozzle further comprises a cylindrical constrictor portion in tandem with said recombination portion, said recombination portion and said expansion portion merging at a circular transition, said transition and said constrictor portion having a diameter ratio of said transition to said constrictor within a range from about 1.5 to about 4.0.

20. The arcjet thruster according to claim 14 wherein said expansion portion terminates in a circular mouth, said mouth and said constrictor portion having a diameter ratio of said mouth to said constrictor portion within a range from about 30 to about 250.

21. The arcjet thruster according to claim 14, wherein the length of said cylindrical constrictor portion is about equal to its diameter.

22. An anode body for use in an arcjet thruster, said anode body defining a convergent-divergent nozzle therein symmetrical about a central axis therethrough, said nozzle having tandemly arranged along said axis a convergent portion, a cylindrical constrictor portion, a divergent recombination portion, and a divergent expansion portion, said divergent expansion portion having a greater angle of divergence than said recombination portion.

23. The anode body according to claim 22 wherein each of said divergent portions has a generally conical shape.

24. The anode body according to claim 23 wherein said recombination portion has a cone half angle of between about 5 degrees and 15 degrees.

25. The anode body according to claim 23 wherein said expansion portion has a cone half angle of between about 20 degrees and about 40 degrees.

26. The anode body according to claim 24 wherein said expansion portion has a cone half angle of no more than about 40 degrees.

27. The anode body according to claim 26 wherein said recombination and expansion portions merge at a circular transition, said transition and said constrictor portion having a diameter ratio of said transition to said constrictor within a range from about 1.5 to 4.0.

28. Anode body according to claim 27 wherein said expansion portion terminates in a circular mouth, said mouth and said constrictor portion having a diameter ratio of said mouth to said constrictor portion within a range of from about 30 to about 50.

* * * * *